(12) United States Patent
Kim et al.

(10) Patent No.: US 9,363,629 B2
(45) Date of Patent: Jun. 7, 2016

(54) METHOD AND APPARATUS FOR OBTAINING LOCATION OF USER

(71) Applicant: SAMSUNG ELECTRONICS CO., LTD., Suwon-Si (KR)

(72) Inventors: Yong Kim, Seoul (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/846,340

(22) Filed: Mar. 18, 2013

(65) Prior Publication Data

US 2013/0303185 A1 Nov. 14, 2013

(30) Foreign Application Priority Data

May 11, 2012 (KR) .................. 10-2012-0050346

(51) Int. Cl.
*H04W 4/02* (2009.01)
*G01S 5/02* (2010.01)

(52) U.S. Cl.
CPC ............ *H04W 4/02* (2013.01); *G01S 5/0252* (2013.01)

(58) Field of Classification Search
CPC ....... G01S 5/0045; G01S 5/026; G01S 5/021; H04W 24/00; H04W 4/04
See application file for complete search history.

(56) References Cited

U.S. PATENT DOCUMENTS

| | | | | |
|---|---|---|---|---|
| 6,169,902 B1 * | 1/2001 | Kawamoto | ................ | 455/456.4 |
| 6,397,073 B1 * | 5/2002 | Hottinen | ................... | 455/456.5 |
| 7,899,006 B2 * | 3/2011 | Boyd | ............................ | 370/328 |
| 7,904,244 B2 | 3/2011 | Sugla | | |
| 8,547,223 B2 * | 10/2013 | Midtun et al. | ........... | 340/539.13 |
| 2005/0075119 A1 * | 4/2005 | Sheha et al. | ................ | 455/456.6 |
| 2008/0039114 A1 * | 2/2008 | Phatak et al. | ............... | 455/456.1 |
| 2008/0077326 A1 * | 3/2008 | Funk et al. | ..................... | 701/220 |
| 2009/0315995 A1 * | 12/2009 | Khosravy et al. | ............ | 348/158 |
| 2010/0081451 A1 * | 4/2010 | Mueck et al. | ............... | 455/456.1 |
| 2010/0159951 A1 | 6/2010 | Shkedi | | |
| 2011/0065450 A1 | 3/2011 | Kazmi | | |
| 2011/0237274 A1 * | 9/2011 | Wong et al. | ................ | 455/456.1 |
| 2011/0250903 A1 * | 10/2011 | Huang et al. | ............... | 455/456.1 |
| 2011/0294517 A1 * | 12/2011 | Hahm et al. | ............... | 455/456.1 |
| 2012/0143495 A1 * | 6/2012 | Dantu | ........................... | 701/428 |

FOREIGN PATENT DOCUMENTS

| | | |
|---|---|---|
| KR | 10-0848322 B1 | 7/2008 |
| WO | WO 2011/144968 A1 | 11/2011 |

OTHER PUBLICATIONS

Extended European Search Report issued by the European Patent Office on Feb. 5, 2014 for the corresponding European Patent Application No. 13164242.3.

* cited by examiner

*Primary Examiner* — William Nealon
(74) *Attorney, Agent, or Firm* — NSIP Law

(57) ABSTRACT

A method of obtaining a location of a user includes obtaining first location information of the user; searching a pre-stored first map for a plurality of candidate areas corresponding to the first location information; selecting at least one search area from the plurality of candidate areas corresponding to the first location information based on second location information of the user; and determining the location of the user using at least one search area.

33 Claims, 8 Drawing Sheets

FIG. 6
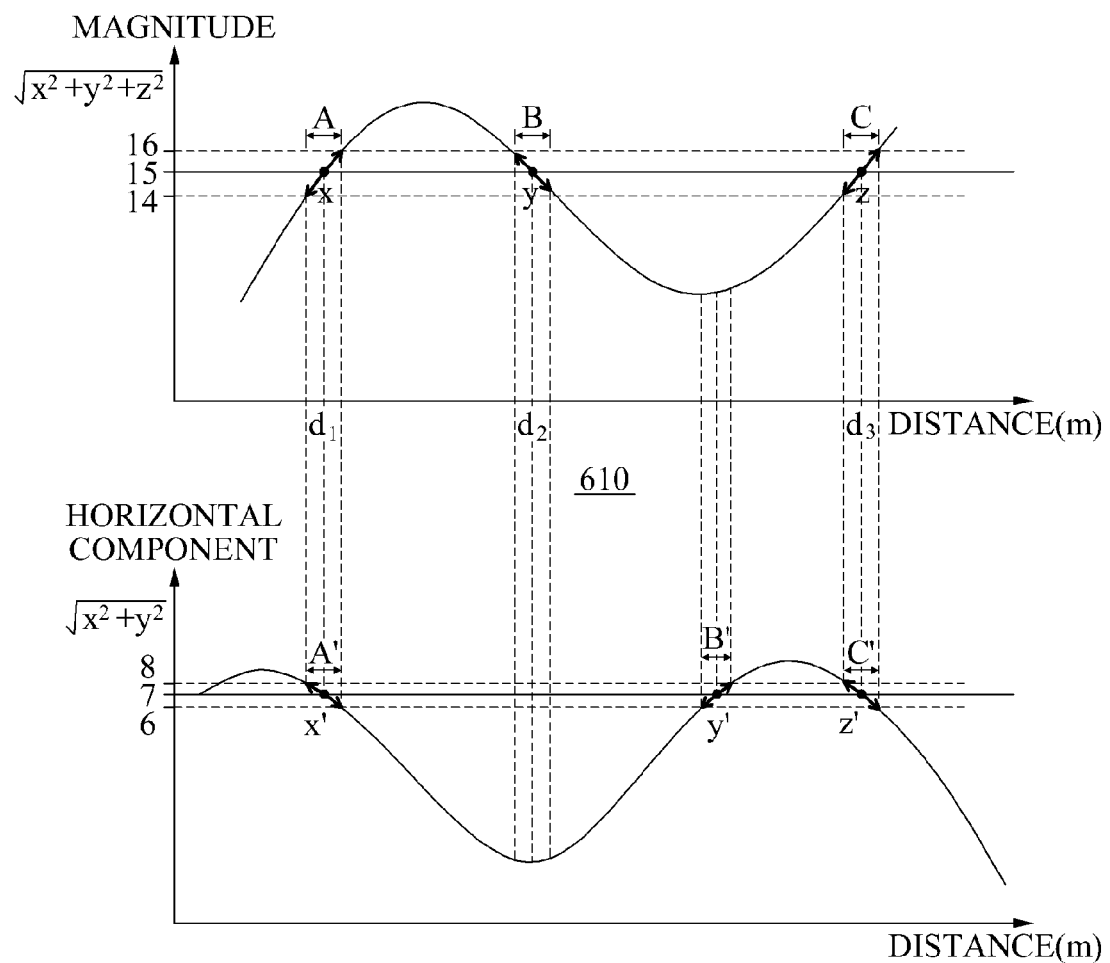
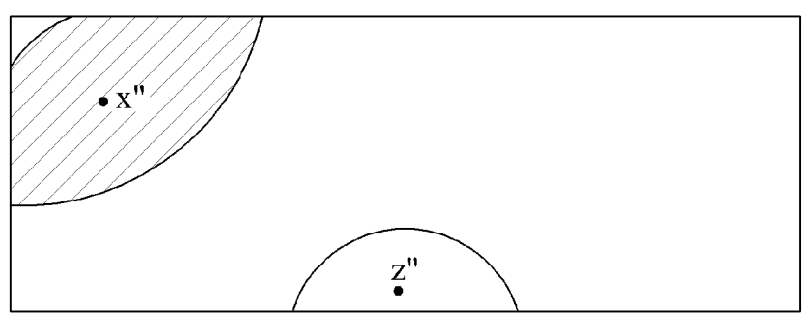

METHOD AND APPARATUS FOR OBTAINING LOCATION OF USER

CROSS-REFERENCE TO RELATED APPLICATIONS

This application claims the benefit under 35 USC 119(a) of Korean Patent Application No. 10-2012-0050346 filed on May 11, 2012, in the Korean Intellectual Property Office, the entire disclosure of which is incorporated herein by reference for all purposes.

BACKGROUND

1. Field

The following description relates to a method and an apparatus for obtaining a location of a user.

2. Description of Related Art

With an increase in use of smart phones, location estimation technology for providing a location-based service (LBS) has been used in various fields. Location estimation technology using a global positioning system (GPS) and map information, such as contour information, latitude and longitude information, and other map information, about an outdoor environment may be employed in the outdoor environment. On the other hand, even though a variety of location estimation technologies may be employed in an indoor environment, there is no particular technology having an excellent performance in the indoor environment, and accordingly a suitable technology may be selected and used based on particular circumstances in the indoor environment.

In general, in the case of location estimation technology using a fingerprint map, the positioning result measured using a fingerprint map may vary slightly based on an environment such as an installation circumstance of infrastructure, structures, and other factors. Accordingly, locations of feature points may differ between a wireless local area network (WLAN) fingerprint map and a magnetic fingerprint map. Furthermore, there may be a plurality of feature points having similar patterns. In this case, a relatively large amount of time may be required to obtain an initial location of a user.

SUMMARY

In one general aspect, a method of obtaining a location of a user includes obtaining first location information of the user; searching a pre-stored first map for a plurality of candidate areas corresponding to the first location information; selecting at least one search area from the plurality of candidate areas corresponding to the first location information based on second location information of the user; and determining the location of the user using the at least one search area.

The selecting may include selecting the at least one search area from the plurality of candidate areas corresponding to the first location information based on the second location information and a statistical error of the second location information.

The method may further include searching a pre-stored second map for a plurality of candidate areas corresponding to the second location information.

The selecting may include selecting the at least one search area from the plurality of candidate areas corresponding to the first location information based on the plurality of candidate areas corresponding to the second location information.

The selecting may further include determining whether the plurality of candidate areas corresponding to the first location information overlap the plurality of candidate areas corresponding to the second location information; and selecting the at least one search area from the plurality of candidate areas corresponding to the first location information based on a result of the determining.

The selecting may further include selecting, as the at least one search area, an area of the plurality of candidate areas corresponding to the first location information that overlaps the plurality of candidate areas corresponding to the second location information.

The location of the user may include an initial location of the user.

A range of each of the plurality of candidate areas corresponding to the first location information may be pre-selected.

A range of each of the plurality of candidate areas corresponding to the first location information may be pre-selected based on a statistical error of the first location information.

The searching may include searching the pre-stored first map for the plurality of candidate areas corresponding to the first location information based on the first location information and a statistical error of the first location information.

The method may further include maintaining information of a plurality of maps including the first map and information about a statistical error of each of the first location information and the second location information.

The first location information may include horizontal location information measured by a magnetic field sensor and the second location information may include vertical location information measured by the magnetic field sensor, or the first location information may include the vertical location information and the second location information may include the horizontal location information.

The first location information and the second location information may indicate a same location.

In another general aspect, a non-transitory computer-readable storage medium stores a program for controlling a computer to perform the method described above.

In another general aspect, an apparatus for obtaining a location of a user includes an obtaining unit configured to obtain first location information of the user; a search unit configured to search a pre-stored first map for a plurality of candidate areas corresponding to the first location information; a selecting unit configured to select at least one search area from the plurality of candidate areas corresponding to the first location information based on second location information of the user; and a determining unit configured to determine the location of the user using the at least one search area.

The selecting unit may be further configured to select the at least one search area from the plurality of candidate areas corresponding to the first location information based on the second location information and a statistical error of the second location information.

The search unit may be further configured to search a pre-stored second map for a plurality of candidate areas corresponding to the second location information.

The selecting unit may be further configured to select the at least one search area from the plurality of candidate areas corresponding to the first location information based on the plurality of candidate areas corresponding to the second location information.

The selecting unit may include a determiner configured to determine whether the plurality of candidate areas corresponding to the first location information overlap the plurality of candidate areas corresponding to the second location information; and a selector configured to select the at least one search area from the plurality of candidate areas corresponding to the first location information based on a result obtained by the determiner.

The selecting unit may be further configured to select, as the at least one search area, an area of the plurality of candidate areas corresponding to the first location information that overlaps the plurality of candidate areas corresponding to the second location information.

The search unit may be further configured to search the pre-stored first map for the plurality of candidate areas corresponding to the first location information based on the first location information and a statistical error of the first location information.

The apparatus may further include a storage unit configured to maintain information of a plurality of maps including the first map and information about a statistical error of each of the first location information and the second location information.

In another general aspect, a method of obtaining a location of a user includes obtaining a search area containing the location of the user from a first map based on first location information of the user and second location information of the user; and obtaining the location of the user from the search area; wherein the search area is smaller than an entire area covered by the first map; and the first location information of the user and the second location information of the user are different types of location information.

The method may further include measuring a first physical quantity at the location of the user to obtain the first location information of the user; and deriving the second location information of the user from the first location information of the user; wherein the first map is created based on measurements of the first physical quantity made at a plurality of different locations in the entire area covered by the first map.

The method may further include measuring a first physical quantity at the location of the user to obtain the first location information of the user; and measuring a second physical quantity at the location of the user to obtain the second location information of the user; wherein the first map is created based on measurements of the first physical quantity made at a plurality of different locations in the entire area covered by the first map.

The obtaining of the search area may include searching the first map for a plurality of first candidate areas likely to contain the location of the user based on the first location information; searching a second map for a plurality of second candidate areas likely to contain the location of the user based on the second location information, the second map covering a same area as the first map; and selecting an area where plurality of first candidate areas overlaps the plurality of second candidate areas as the search area.

The searching of the first map may include limiting a range of each of the plurality of first candidate areas based on a statistical error of the first location information; and the searching of the second map may include limiting a range of each of the plurality of second candidate areas based on a statistical error of the second location information.

Other features and aspects will be apparent from the following detailed description, the drawings, and the claims.

BRIEF DESCRIPTION OF THE DRAWINGS

FIG. 6 is a diagram for describing an example of a method of determining a location of a user based on a variety of information.

DETAILED DESCRIPTION

Figure 1:
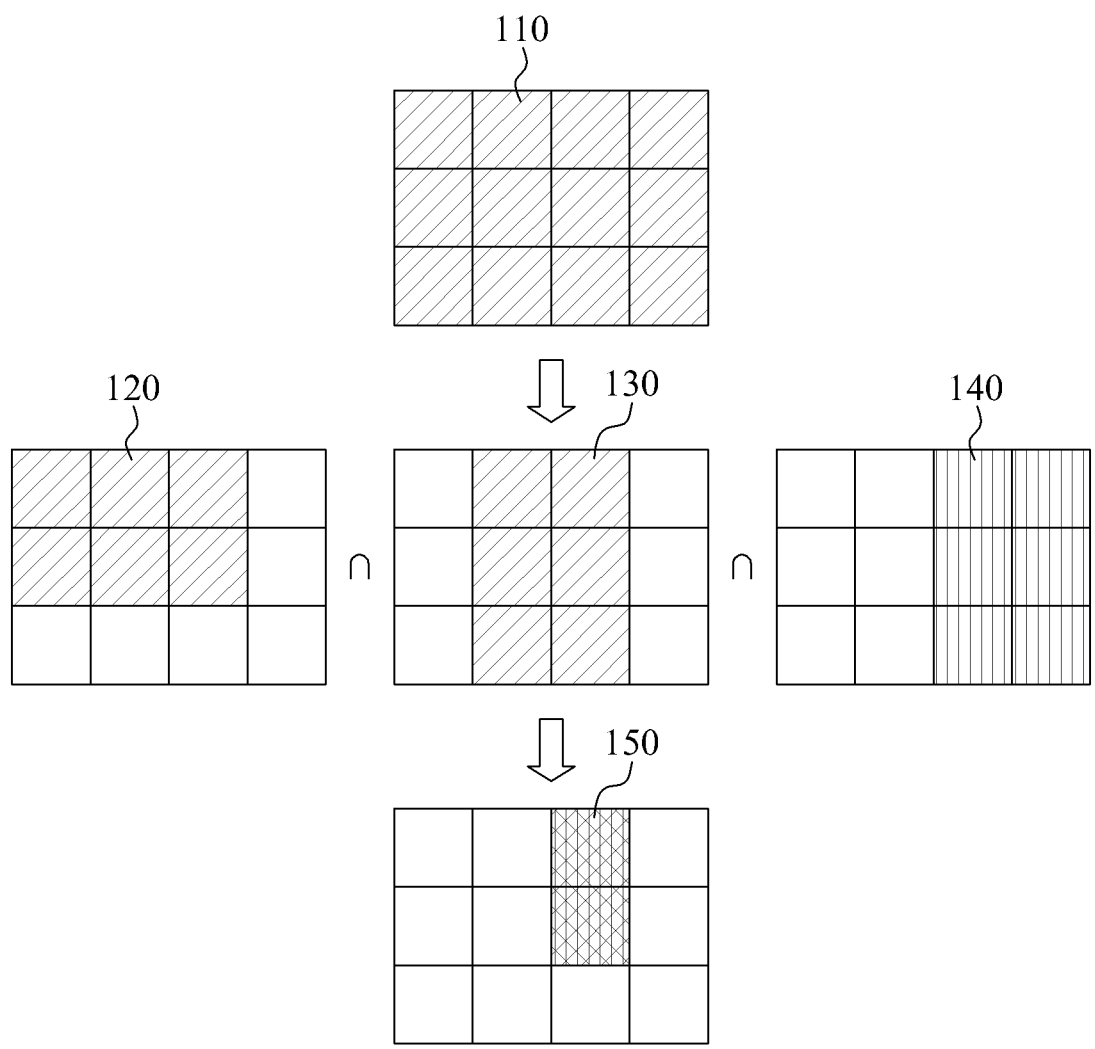
FIG. 1 is a diagram for describing an example of a method of obtaining a location of a user.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

In general, the following three methods may be employed to estimate a location in an indoor environment.

A method of utilizing a mobile communication signal may be employed. To obtain an indoor location of a portable terminal capable of performing mobile communication, a location of the portable terminal may be approximated to a location of a cell base station to which the portable terminal is connected. Alternatively, triangulation may be performed by measuring a time of arrival (TOA) of a signal for at least three neighboring base stations. The first scheme is a proximity scheme, and the second scheme is a TOA or a time difference of arrival (TDOA) scheme.

A method of utilizing a wireless local area network (WLAN) may be employed. Similar to the aforementioned scheme of using a cell base station, a location of a WLAN terminal may be approximated to a location of an access point (AP) to which the WLAN terminal is connected in a proximity scheme. Alternatively, by measuring a signal strength of a neighboring AP and by matching a pattern with a previously stored fingerprint map, the location of the WLAN terminal may be found.

The above method of utilizing the WLAN has been regarded as the most promising technology based on the fact that this method has an appropriate accuracy, and a WLAN system has already been installed in many buildings and most portable terminals.

A method of utilizing ultra-wideband (UWB) communication may be employed. This method may perform triangulation by measuring a distance from an AP that generates a UWB communication signal.

The above method of utilizing the UWB communication may precisely measure a DOA of a signal using a characteristic of UWB, and thus may accurately estimate a location. The above method is provided in a form of an integrated hardware/software solution to be employed for a current distribution management system.

In examples disclosed in this application, a magnetic field positioning system is employed to more stably and accurately estimate an indoor location. Similar to the WLAN fingerprint technology, the magnetic field positioning technology may create a magnetic field map for each pre-measured indoor location, and then may estimate a location by matching a magnetic field value measured by a terminal, a robot, or other device to the magnetic field map.

FIG. 1 is a diagram for describing an example of a method of obtaining a location of a user. Referring to FIG. 1, a map 110 is an entire map to be searched to obtain an initial location of a user, a map 120 is a map based on first information, a map 130 is a map based on second information, and a map 140 is a map based on third information. The maps 110, 120, 130, and 140 cover the same area. A shaded portion in each of the maps 110, 120, 130, and 140 indicates the search range to obtain the initial location of the user based on the respective information. For example, the shaded portion indicates an area in which the user is estimated to be located based on the respective information.

Accordingly, a size of a map to be searched in order to estimate the location of the user may be reduced by searching only a search area 150 indicated by shading corresponding to an intersection of areas in which the user is estimated to be located in the maps 110, 120, 130, and 140. Each of the maps 110, 120, 130, and 140 may include a variety of information that may be collected to estimate the location of the user, in addition to magnetic field information such as horizontal location information, vertical location information, and other magnetic field information. By reducing the size of the map to be searched in order to estimate the location of the user, it is possible to decrease an amount of time used to obtain the initial location of the user and to increase the positioning accuracy.

Figure 2:
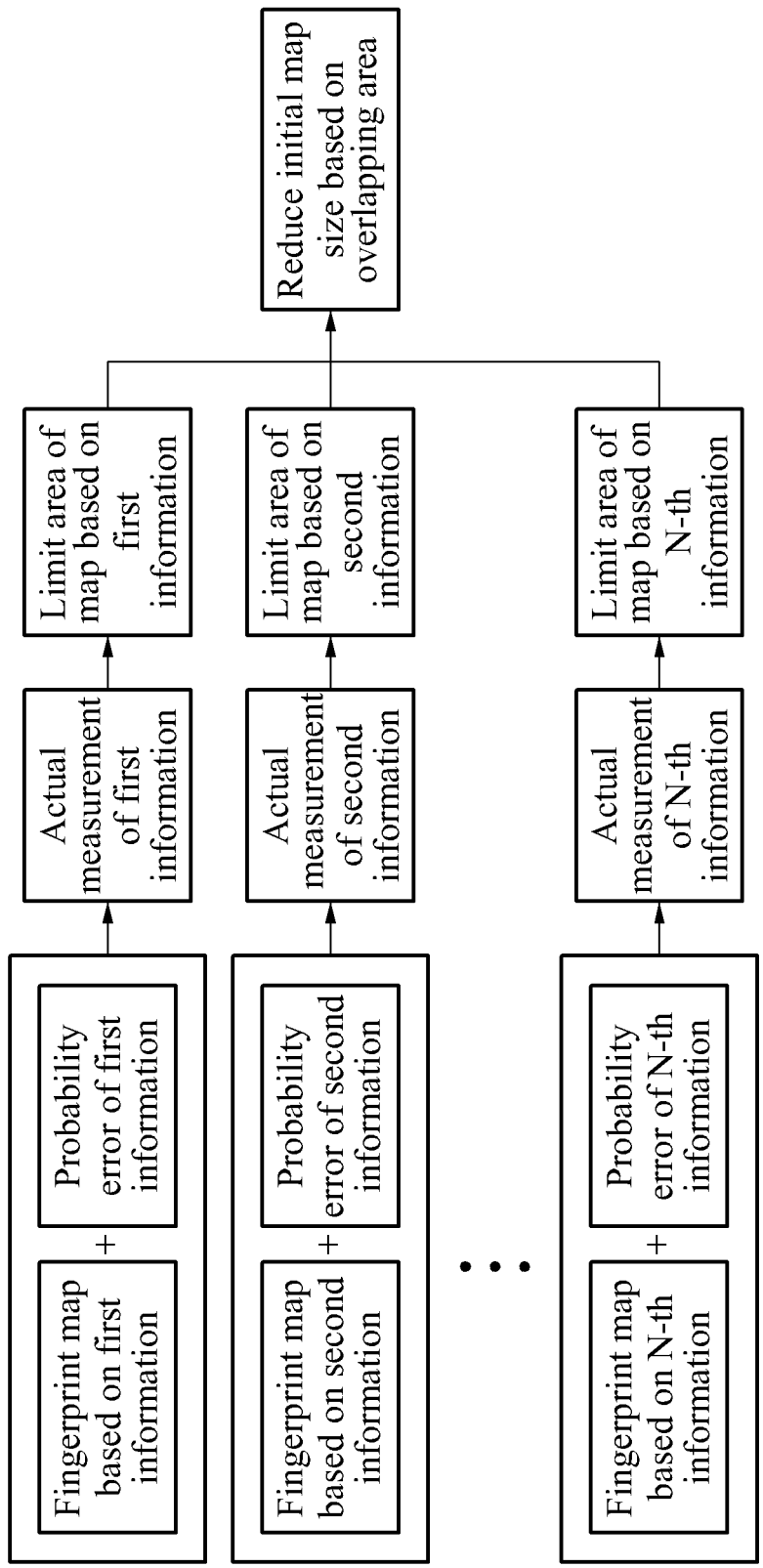
FIG. 2 is a diagram for describing an example of a method of obtaining a location of a user using a plurality of fingerprint maps.

FIG. 2 is a diagram for describing an example of a method of obtaining a location of a user using a plurality of fingerprint maps. Referring to FIG. 2, using information of a plurality of maps and a unique statistical error, for example, a probability error of information that is used as a basis to create each of the plurality of maps, it is possible to decrease the size of the search window for obtaining a location of a user.

The plurality of maps may be created in a form of a fingerprint map based on independent information that can be extracted from a map that includes a magnetic field magnitude, such as a horizontal magnetic field component value, a vertical magnetic field component value, a direction of a magnetic field, an angle between horizontality and verticality, and any other information that can be extracted from the map.

In this example, a fingerprint map is a map that is created using a fingerprint scheme. The fingerprint scheme is a location recognition scheme of determining a location by comparing a signal strength measured by a terminal with a pre-measured signal strength. The pre-measured signal strength may be stored in a database or other location. A strength of a signal that is transmitted from all access points (APs) to the terminal at each location may be stored.

Examples of the fingerprint map include a WLAN fingerprint map, a magnetic field fingerprint map, a vision fingerprint map, a magnetic field fingerprint map containing magnetic field values that are pre-measured at predetermined indoor locations, and other types of fingerprint maps depending on a positioning technology that is employed in the terminal.

In examples disclosed in this application, in addition to information constituting a map, such as magnetic field information, radio-frequency received signal strength indication (RF-RSSI) information, and other information, a variety of information obtained from outside an apparatus for obtaining a location of a user (hereinafter referred to as a location obtaining apparatus) may be employed to reduce a size of a map search area.

Information of a plurality of maps and information associated with a unique statistical error, for example, a probability error of information that is used as a basis to create each of the plurality of maps, may be pre-stored in a memory, a storage device, or another device.

In examples disclosed in this application, a location obtaining apparatus may use pre-stored information of a plurality of maps and pre-stored information associated with a unique statistical error of each type of information that is used as a basis to create each of the plurality of pre-stored maps.

In FIG. 2, a fingerprint map based on first information, a fingerprint map based on second information, . . . , a fingerprint map based on N-th information contain the respective information. The first information may be a horizontal magnetic field component value, the second information may be a vertical magnetic field component value, and third information may be an angle between horizontality and verticality.

Information of the plurality of maps may be extracted from a map in a fingerprint form, and may also be obtained from outside a location obtaining apparatus), such as a WLAN map, a radio frequency identification (RFID) map, a vision map, and any other type of map.

For example, information that is used as a basis to create each of the plurality of maps may be obtained from a map of a magnetic field magnitude according to the following method. From the magnetic field magnitude $(x^2+y^2+z^2)^{1/2}$, the horizontal magnetic field component value may be obtained or derived using $(x^2+y^2)^{1/2}$, and the vertical magnetic field component value may be obtained or derived using $(z^2)^{1/2}$. Also, the angle between horizontality and verticality may be obtained or derived using the horizontal magnetic field component value and the vertical magnetic field component value.

Information associated with a unique statistical error of information that is used as a basis to create each of the plurality of maps may include a statistical error of the horizontal magnetic field component value, a statistical error of the vertical magnetic field component value, a statistical error of the angle between horizontality and verticality, and a statistical error of any other information used to create any of the plurality of maps.

The location obtaining apparatus may actually measure information, for example, the first information, the second information, . . . , the N-th information, that is used as the basis to create each of the plurality of maps. Based on the measured information and information associated with statistical errors, the location obtaining apparatus may reduce or limit a search area for obtaining a location of a user for each of the plurality of maps.

By reducing the search area for obtaining an initial position of the user and by applying the reduced search area to a map from which the initial location is desired to be measured, it is possible to reduce the search window for obtaining the initial position of the user.

Figure 3:
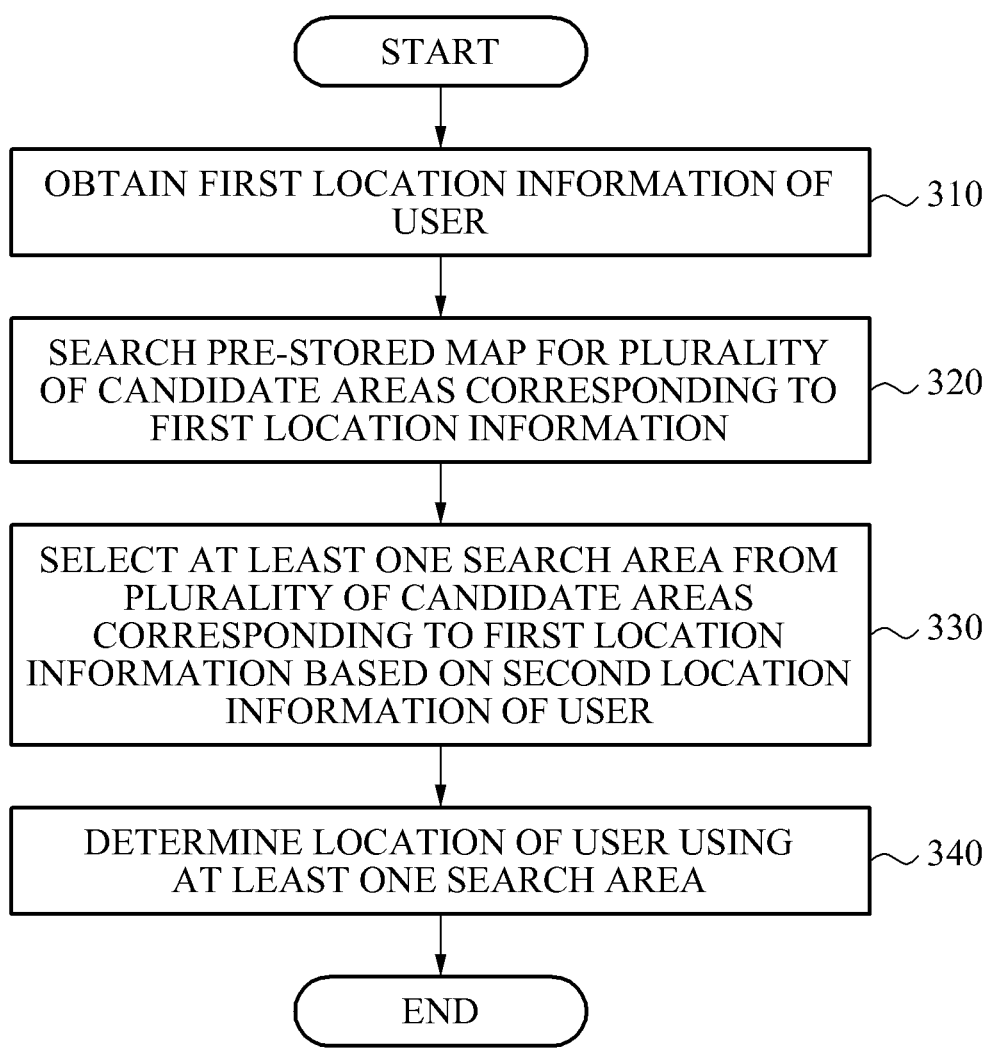
FIG. 3 is a flowchart illustrating an example of a method of obtaining a location of a user.

FIG. 3 is a flowchart illustrating an example of a method of obtaining a location of a user. Hereinafter, location information denotes information that is used to estimate the location of the user, and may be obtained through an actual measurement or may be estimated through calculation or another estimation method. Referring to FIG. 3, in 310, a location obtaining apparatus obtains first location information of the user. The first location information may be actually measured.

In 320, the location obtaining apparatus searches a prestored first map for a plurality of candidate areas corresponding to the first location information. The plurality of candidate areas are areas in the first map in which the user is highly likely to be located based on the first location information. A range of each of the plurality of candidate areas may be pre-selected based on a statistical error of the first location information.

The location obtaining apparatus may search for the plurality of candidate areas based on the first location information and the statistical error of the first location information. The statistical error is a unique probability error of the first location information. For example, when a unique probability error of the first location information is ±1 and a value of measured first location information is 15, the first location information is estimated to be within a range of 14 to 16.

For example, first location information of the user may include one of a horizontal magnetic field component value, a vertical magnetic field component value, a direction of a magnetic field, and an angle between horizontality and verticality that are measured by a magnetic field sensor. The magnetic field sensor may be used to determine the location of the user.

A method of searching the first map for the plurality of candidate areas performed by the location obtaining apparatus will be described later with reference to FIG. 5.

In 330, the location obtaining apparatus selects at least one search area from the plurality of candidate areas based on second location information of the user. The second location information is information that is used to create a map other than the first location information, for example, the horizontal magnetic field component value, the vertical magnetic field component value, the direction of the magnetic field, the angle between horizontality and verticality, and any other information that are measured by the magnetic field sensor, information that is measured by an acceleration sensor, an inertial sensor, a gyro sensor, a pressure sensor, an ultrasound sensor, or other sensor, or any of a variety of information that is obtained from outside the location obtaining apparatus, for example, RF-RSSI information, a WLAN map, an RFID map, a vision map, and any other information.

The first location information and the second location information indicate the same location.

The term "search area" denotes an area in which the user is recognized to be actually located based on the second location information among the plurality of candidate areas. Accordingly, the search area may be reduced to an area that is an intersection of the plurality of candidate areas as shown in FIG. 1. For example, when the plurality of candidate areas include areas A, B, and C respectively shown as the shaded portions in the maps 120, 130, and 140, the search area may be reduced to the search area 150 indicated by shading, which is an intersection of the areas A, B, and C.

In 330, the location obtaining apparatus may select at least one search area from the plurality of candidate areas based on the second location information and a statistical error of the second location information.

A method of selecting at least one search area from the plurality of candidate areas based on the second location information and the statistical error of the second location information performed by the location obtaining apparatus will be described later with reference to FIG. 6.

In 340, the location obtaining apparatus determines the location of the user using the at least one search area. The location of the user may include an initial location of the user. The initial location may be a location of the user that is initially estimated to provide a positioning service to the user. For example, the initial location may be a location of the user that is obtained when the user initially powers on a positioning service providing apparatus, or when the user initially runs a positioning service providing application. The location of the user may be determined to be a location of a search area that is finally selected from the at least one search area as described below with reference to FIG. 6.

Figure 4:
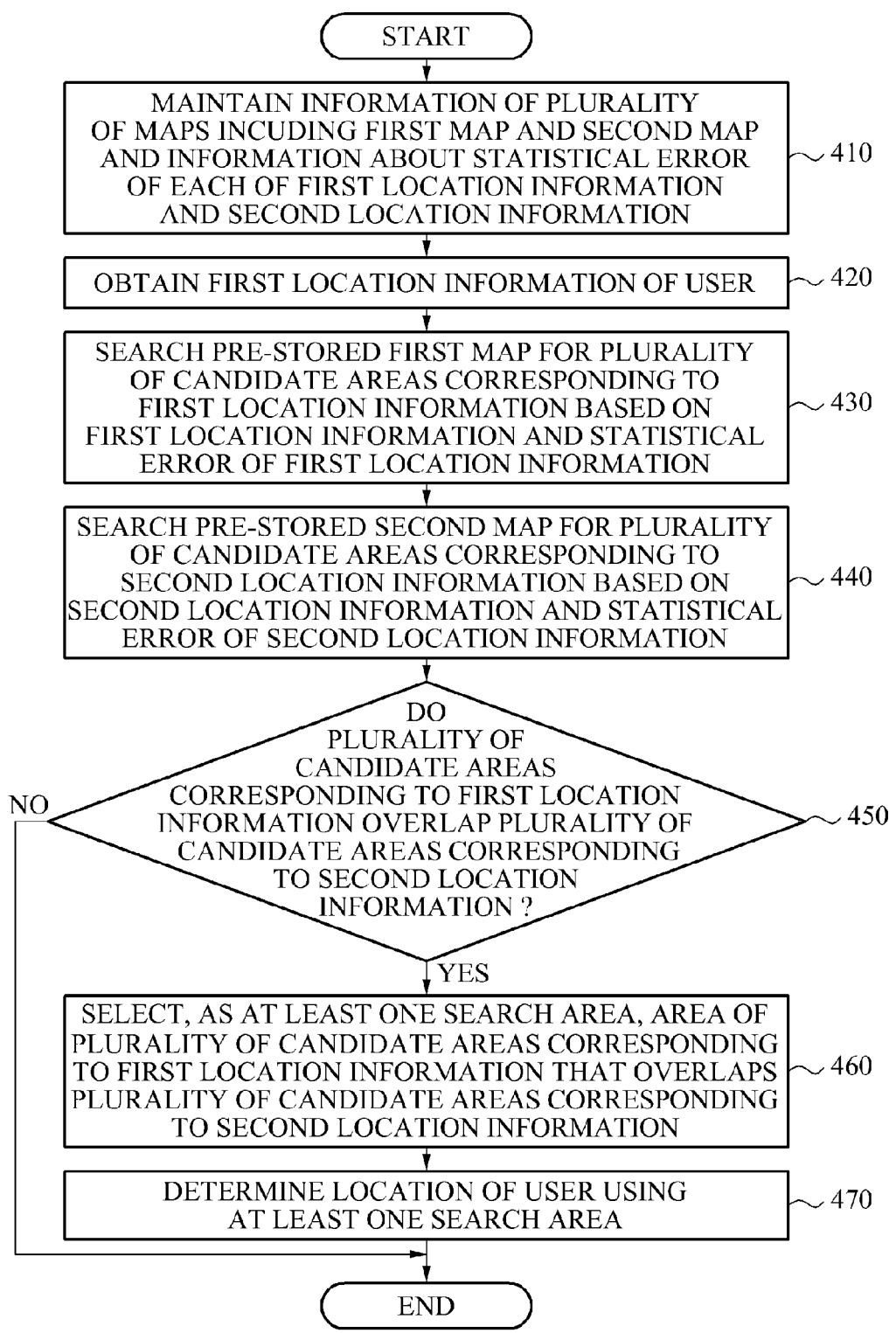
FIG. 4 is a flowchart illustrating another example of a method of obtaining a location of a user.

FIG. 4 is a flowchart illustrating another example of a method of obtaining a location of a user. In 410, an obtaining apparatus maintains information of a plurality of maps including a first map and a second map, and information about a statistical error of each of first location information and second location information.

In 420, the location obtaining apparatus obtains first location information of a user.

In 430, the location obtaining apparatus searches the prestored first map for a plurality of candidate areas corresponding to the first location information. A range of each of the plurality of candidate areas corresponding to the first location information may be pre-selected based on the statistical error of the first location information. The location obtaining apparatus may search for the plurality of candidate areas based on the first location information and the statistical error of the first location information.

In 440, the location obtaining apparatus searches the prestored second map for a plurality of candidate areas corresponding to the second location information. A range of each of the plurality of candidate areas corresponding to the second location information may be pre-selected based on the statistical error of the second location information. The location obtaining apparatus may search for the plurality of candidate areas based on the second location information and the statistical error of the second location information.

The location obtaining apparatus may search for at least one search area from the plurality of candidate areas corresponding to the first location information and the plurality of candidate areas corresponding to the second location information.

In 450, the location obtaining apparatus determines whether the plurality of candidate areas corresponding to the first location information overlap the plurality of candidate areas corresponding to the second location information, and selects at least one search area based on a result of the determination in 450.

When it is determined in 450 that the plurality of candidate areas corresponding to the first location information overlap the plurality of candidate areas corresponding to the second location information, in 460 the location obtaining apparatus selects, as the at least one search area, an area of the plurality of candidate areas corresponding to the first location information that overlaps the plurality of candidate areas corresponding to the second location information.

On the contrary, when it is determined in 450 that the plurality of candidate areas corresponding to the first location information do not overlap the plurality of candidate areas corresponding to the second location information, the location obtaining apparatus may terminate an operation as shown in FIG. 4, or may select, as the at least one search area, the plurality of candidate areas corresponding to the first location information (not shown in FIG. 4).

In 470, the location obtaining apparatus determines the location of the user using the at least one search area. The location of the user may be determined to be a location of a search area that is finally selected from the at least one search area as described below with reference to FIG. 6.

Figure 5:
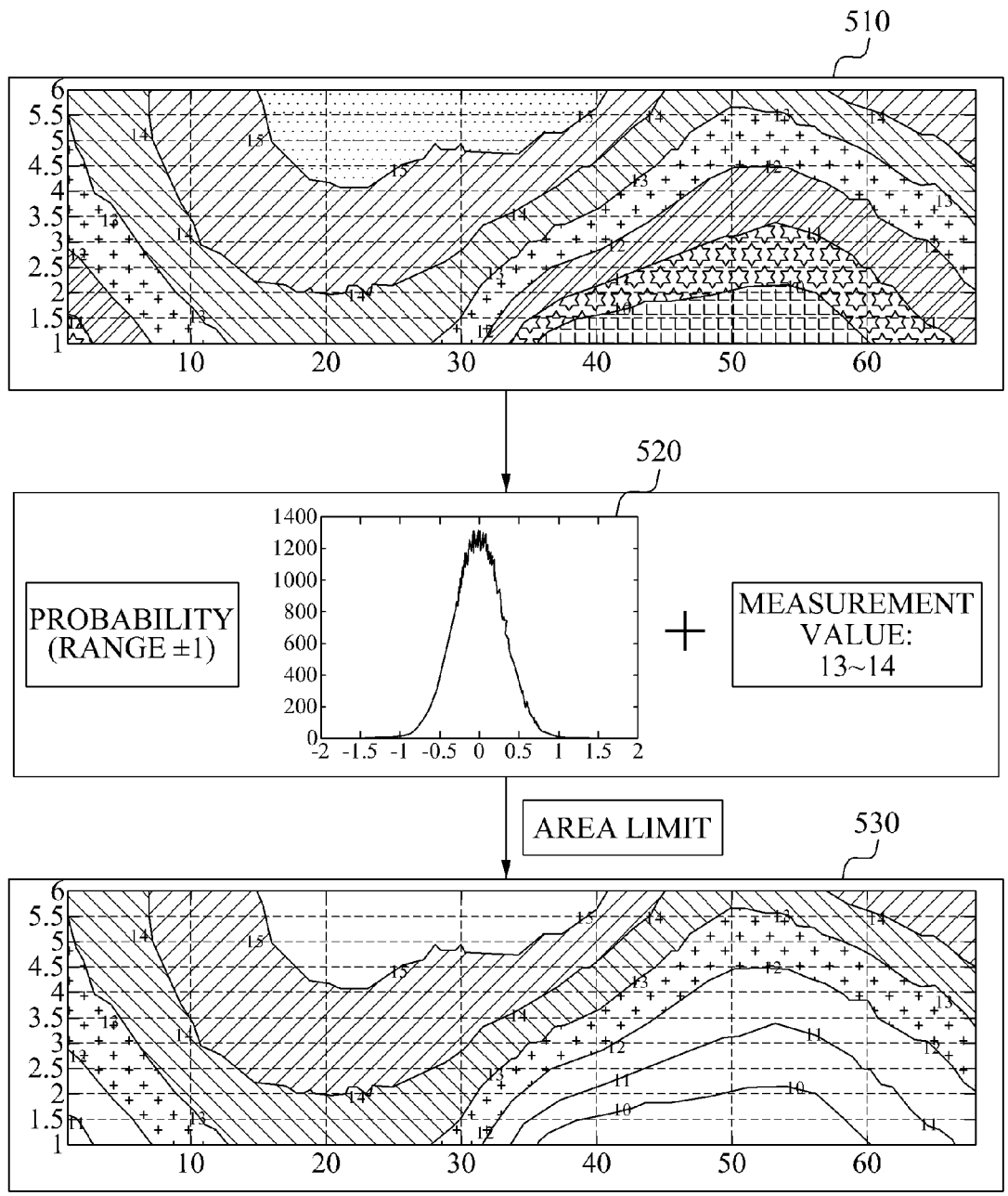
FIG. 5 is a diagram for describing an example of a method of obtaining a location of a user using a map based on a horizontal magnetic field component value and a unique statistical error of the horizontal magnetic field component value.

FIG. 5 is a diagram for describing an example of a method of obtaining a location of a user using a map based on a horizontal magnetic field component value and unique statistical error of the horizontal magnetic field component value. A method of searching a pre-stored first map for a plurality of candidate areas corresponding to first location information of a user, for example, a horizontal magnetic field component value, will be described with reference to FIG. 5. Referring to FIG. 5, a map 510 is created based on a horizontal magnetic field component value, and a graph 520 shows information associated with a unique statistical error, in this case, a probability error of the horizontal magnetic field component value.

It can be seen from the graph 520 that the unique probability error of the horizontal magnetic field component value is zero outside the range of ±1.

Accordingly, when a value obtained by measuring the horizontal magnetic field component falls in a range between 13 and 14, (13~14)±1=12~15. Accordingly, in the map 510 that is created based on the horizontal magnetic field component value, only an area in which the horizontal magnetic field component value is 12 to 15 is determined as a candidate area, and a remaining section is excluded from the candidate area. Accordingly, only an area 530 in which the horizontal magnetic field component value is in a range of to 12 to 15 is searched from the entire area of the map 510.

The above process may also be performed for maps that are based on a vertical magnetic field component value, a direction of a magnetic field, an angle between horizontality and verticality, and any other information.

FIG. 6 is a diagram for describing an example of a method of determining a location of a user based on a variety of information. Referring to FIG. 6, a graph 610 shows information of a first map of a magnetic field magnitude $(x^2+y^2+z^2)^{1/2}$ that is measured by a magnetic field sensor, and a graph 620 shows information of a second map of a horizontal magnetic field component value $(x^2+y^2)^{1/2}$ that is extracted from the first map of the magnetic field magnitude. A map 630 shows Wi-Fi information.

For example, when it is assumed that the magnetic field magnitude constitutes first location information of the user and has a measured value of 15, the value of the magnetic field magnitude is 15 at points x, y, and z respectively located at distances $d_1$, $d_2$, and $d_3$ in the graph 610. Assuming that a statistical error of the magnetic field magnitude is ±1, areas A, B, and C in the graph 610 corresponding to locations at which the value of the magnetic field magnitude is in a range of 14 to 16 are determined as candidate areas in which the user is highly likely to be located.

Accordingly, when considering the statistical error of the magnetic field magnitude, the areas A, B, and C in the graph 610 are determined to be candidate areas corresponding to the magnetic field magnitude, i.e., the first location information of the user, because the user is highly likely to be located in the areas A, B, and C based on the magnetic field magnitude.

Next, at least one search area is selected from the plurality of candidate areas A, B, and C based on using the graph 620 of the horizontal magnetic field component value. When it is assumed that the horizontal magnetic field component value constitutes second location information of the user and has a measured value of 7, the horizontal magnetic field component value is 7 at points x', y', and z' in the graph 620. Assuming that a statistical error of the horizontal magnetic field component value is ±1, areas A', B', and C' in the graph 620 corresponding to locations at which the horizontal magnetic field component value is in a range of 6 to 8 are determined as candidate areas in which the user is highly likely to be located.

Accordingly, when considering the statistical error of the horizontal magnetic component value, the areas A', B', and C' in the graph 620 are determined to be candidate areas corresponding to the horizontal magnetic component value, i.e., the second location information of the user, because the user is highly likely to be located in the areas A', B', and C' based on the horizontal magnetic field component value.

Among the candidate areas A, B, and C of the graph 610, the areas A and C respectively overlap candidate areas A' and C' of the graph 620. Accordingly, the overlapping areas A and C are selected as search areas from the graph 610 of FIG. 6.

A final search area is then selected from the search areas A and C based on the Wi-Fi information shown in the map 630.

The areas including points x" and z" in the map 630 showing the Wi-Fi information are candidate areas where the user is highly likely to be located based on the Wi-Fi information. The area A in the graph 610 overlaps the candidate area including the point x" in the map 630. The area C in the graph 610 does not overlap either of the candidate areas including the points x" and z" in the map 630. Accordingly, the area A of the graph 610 is selected as the final search area based on the Wi-Fi information shown in the map 630, and the location obtaining apparatus determines the location of the user to the location of the area A. That is, the location of the user is determined to be the location of the area A that is finally selected from the selected search areas A and C.

In this example, to determine an actual location of a user, only the area A is used, rather than using the areas A, B, and C. Accordingly, compared to an initial map, for example, the map corresponding to the graph 610, the search area to be searched may be reduced in order to obtain the location of the user. In addition, the accuracy of location recognition may be enhanced.

Figure 7:
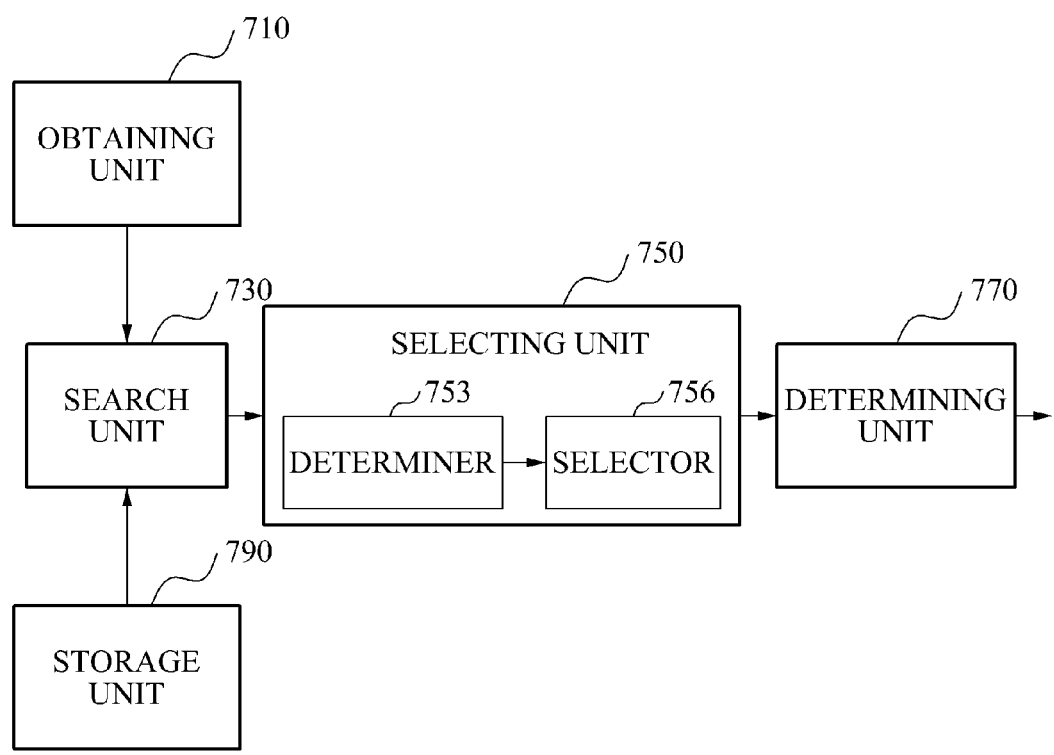
FIG. 7 is a block diagram illustrating an example of an apparatus for obtaining an initial location of a user.

FIG. 7 is a block diagram illustrating an example of an apparatus for obtaining an initial location of a user. Referring to FIG. 7, the location obtaining apparatus includes an obtaining unit 710, a search unit 730, a selecting unit 750, a determining unit 770, and a storage unit 790.

The obtaining unit 710 obtains first location information of the user, for example, by measuring the first location information of the user.

The search unit 730 searches a pre-stored first map for a plurality of candidate areas corresponding to the first location information. The plurality of candidate areas corresponding to the first location information are areas in which the user is highly likely to be located based on the first location information. A range of each of the plurality of candidate areas corresponding to the first location information may be pre-selected based on a statistical error of the first location information. The search unit 730 searches a pre-stored second map for a plurality of candidate areas corresponding to second location information of the user. The plurality of candidate areas corresponding to the second location information are areas in which the user is highly likely to be located based on the second location information. A range of each of the plurality of candidate areas corresponding to the second location information may be pre-selected based on a statistical error of the second location information. The search unit 730 performs the search based on information the search unit 730 receives from the storage unit 790 as described below.

The statistical error of the first location information may be a unique probability error of the first location information, and the statistical error of the second location information may be a unique probability error of the second location information. For example, the probability error may include an error due to a gradient of a location at which a corresponding apparatus or terminal is placed, an error due to a gradient of a location at which a user is using a corresponding apparatus or terminal, an error due to interference caused by a mechanical and/or electronic configuration of an apparatus or a terminal itself, an error caused by unintended interference, and other errors.

The selecting unit 750 selects at least one search area from the plurality of candidate areas corresponding to the first location information based on the plurality of candidate areas corresponding to the second location information. The at least one search area is an area of the plurality of candidate areas corresponding to the first location information in which the user is recognized to be actually located based on the plurality of candidate areas corresponding to the second location information.

The first location information may include either one of horizontal location information and vertical location information that is measured by a magnetic field sensor, and the second location information may include the other one of the horizontal location information and the vertical location information.

The first location information and the second location information indicate the same location.

The selecting unit 750 includes a determiner 753 and a selector 756.

The determiner 753 determines whether the plurality of candidate areas corresponding to the first location information is overlap the plurality of candidate areas corresponding to the second location information.

The selector 756 selects the at least one search area based on a result of the determination made by the determiner 753 by selecting, as the at least one search area, an area of the plurality of candidate areas corresponding to the first location information that the determiner 753 determines overlaps the plurality of candidate areas corresponding to the second location information.

The determining unit 770 determines the location of the user using the at least one search area. The location of the user may include an initial location of the user. The location of the user may be determined to be a location of a search area that is finally selected from the at least one search area as described above with reference to FIG. 6.

The initial location of the user is a location of the user that is initially estimated to provide a positioning service to the user. For example, the initial location may be the location of the user that is obtained when the user initially powers on a positioning service providing apparatus, or when the user initially runs a positioning service providing application.

The storage unit 790 maintains information of a plurality of maps including the first map and the second map. and information about a statistical error of each of the first location information and the second location information, and provides this information to the search unit 730 for use by the search unit 730 in performing the search performed by the search unit 730.

Figure 8:
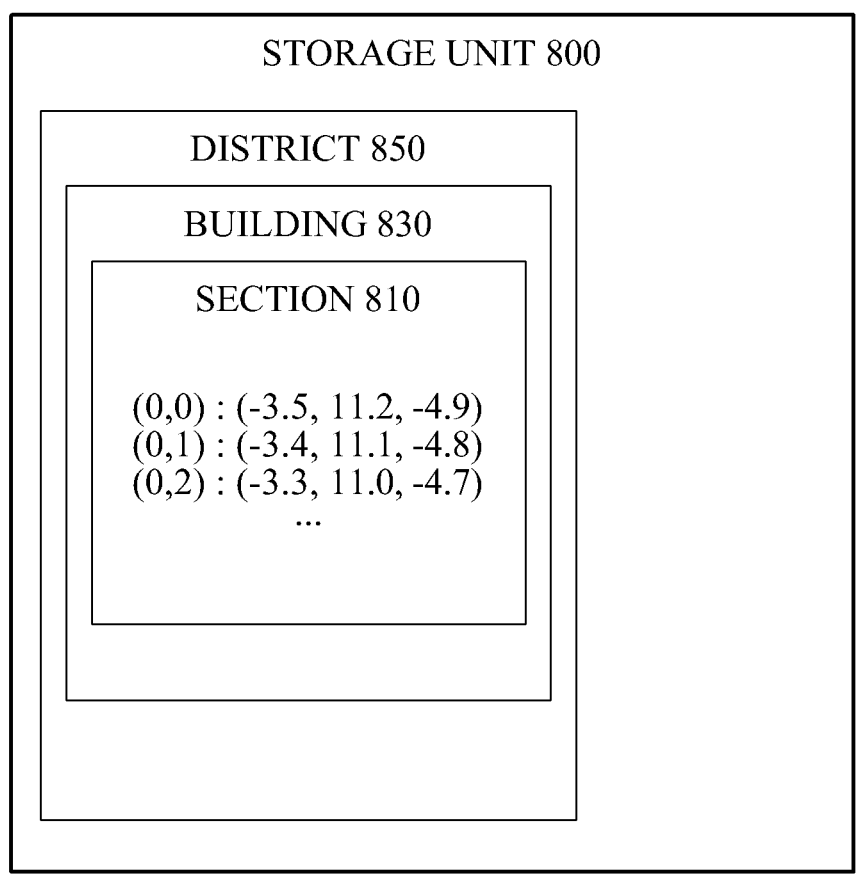
FIG. 8 is a diagram illustrating an example of information stored in a storage unit.

FIG. 8 is a diagram illustrating an example of information stored in a storage unit 800. Referring to FIG. 8, the storage unit 800 stores information of a magnetic field map in a hierarchical structure, such as a district 850 that includes an area in which a terminal is located, a building 830 that is included in the district 850, and a section 810 that is included in the building 830.

The information of the magnetic field map may include coordinate information of the magnetic field map. The coordinate information may be stored in a form of coordinates based on a predetermined reference point. Magnetic field information at the coordinates may be stored as component values (x, y, z) based on the predetermined reference point.

That is, when coordinate information based on the predetermined reference point is (0, 1) in FIG. 8, magnetic field information at the coordinates (0, 1) is stored as (−3.4, 11.1, −4.8) corresponding to component values with respect to directions x, y, and z based on the predetermined reference point.

The storage unit 800 may include information of a plurality of maps, information that is measured by an acceleration sensor, an inertial sensor, a gyro sensor, a pressure sensor, an ultrasound sensor, or any other sensor, a variety of information, for example, RF-RSSI information, a WLAN map, an RFID map, a vision map, and any other information, that is obtained from outside a location obtaining apparatus. The storage unit 800 may include information about a statistical error of location information.

The obtaining unit 710, the search unit 730, the selecting unit 750, the determiner 753, the selector 756, the determining unit 770, the storage unit 790, and the storage unit 800 described above may be implemented using one or more hardware components, one or more software components, or a combination of one or more hardware components and one or more software components.

A hardware component may be, for example, a physical device that physically performs one or more operations, but is not limited thereto. Examples of hardware components include sensors, amplifiers, low-pass filters, high-pass filters, band-pass filters, analog-to-digital converters, digital-to-analog converters, memory devices, wireless adapters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a device used to estimate a location of user as described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blu-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of obtaining a location of a user of a portable terminal, the method performed by a processor comprising:
   obtaining first location information of the user of a mobile device using a magnetic field sensor;
   searching a pre-stored first map including magnetic field information for a plurality of candidate areas corresponding to the first location information;
   selecting at least one search area from the plurality of candidate areas corresponding to the first location information based on second location information of the user; and
   determining the at least one search area as the location of the user,
   wherein the first location information includes one of a horizontal magnetic field component value, a vertical magnetic field component value, a direction of a magnetic field, and an angle between horizontality and verticality that are measured by a magnetic field sensor, and
   wherein the second location information includes one of the horizontal magnetic field component value, the vertical magnetic field component value, the direction of the magnetic field, the angle between horizontality and verticality, and any other information that are measured by the magnetic field sensor except for the one included in the first location information, information that is measured by an acceleration sensor, an inertial sensor, a gyro sensor, a pressure sensor, an ultrasound sensor, or other sensor, or any of a variety of information that is obtained from a RF-RSSI information, a WLAN map, an RFID map, a vision map, and any other information, wherein the pre-stored first map includes coordinate information of a magnetic field map, wherein the magnetic field information at the coordinate information is saved as three-dimensional components.

2. The method of claim 1, wherein the selecting comprises selecting the at least one search area from the plurality of candidate areas corresponding to the first location information based on the second location information and a statistical error of the second location information.

3. The method of claim 1, further comprising searching a pre-stored second map for a plurality of candidate areas corresponding to the second location information.

4. The method of claim 3, wherein the selecting comprises selecting the at least one search area from the plurality of candidate areas corresponding to the first location information based on the plurality of candidate areas corresponding to the second location information.

5. The method of claim 4, wherein the selecting further comprises:
   determining whether the plurality of candidate areas corresponding to the first location information overlap the plurality of candidate areas corresponding to the second location information; and
   selecting the at least one search area from the plurality of candidate areas corresponding to the first location information based on a result of the determining.

6. The method of claim 5, wherein the selecting further comprises selecting, as the at least one search area, an area of the plurality of candidate areas corresponding to the first location information that overlaps the plurality of candidate areas corresponding to the second location information.

7. The method of claim 1, wherein the location of the user comprises an initial location of the user.

8. The method of claim 1, wherein a range of each of the plurality of candidate areas corresponding to the first location information is pre-selected.

9. The method of claim 1, wherein a range of each of the plurality of candidate areas corresponding to the first location information is pre-selected based on a statistical error of the first location information.

10. The method of claim 1, wherein the searching comprises searching the pre-stored first map for the plurality of candidate areas corresponding to the first location information based on the first location information and a statistical error of the first location information.

11. The method of claim 1, further comprising maintaining information of a plurality of maps comprising the first map and information about a statistical error of each of the first location information and the second location information.

12. The method of claim 1, wherein the first location information comprises horizontal location information measured by a magnetic field sensor and the second location information comprises vertical location information measured by the magnetic field sensor, or the first location information comprises the vertical location information and the second location information comprises the horizontal location information.

13. The method of claim 1, wherein the first location information and the second location information indicate a same location.

14. A non-transitory computer-readable storage medium storing a program for controlling a computer to perform the method of claim 1.

15. An apparatus for obtaining a location of a user of a portable terminal, the apparatus comprising:
   an obtaining unit configured to obtain first location information of the user of a mobile device using a magnetic field sensor;
   a search unit configured to search a pre-stored first map including magnetic field information for a plurality of candidate areas corresponding to the first location information;
   a selecting unit configured to select at least one search area from the plurality of candidate areas corresponding to the first location information based on second location information of the user; and
   a determining unit configured to determine the at least one search area as the location of the user,
   wherein the first location information includes one of a horizontal magnetic field component value, a vertical magnetic field component value, a direction of a magnetic field, and an angle between horizontality and verticality that are measured by a magnetic field sensor, and
   wherein the second location information includes one of the horizontal magnetic field component value, the vertical magnetic field component value, the direction of the magnetic field, the angle between horizontality and verticality, and any other information that are measured by the magnetic field sensor except for the one included in the first location information, information that is measured by an acceleration sensor, an inertial sensor, a gyro sensor, a pressure sensor, an ultrasound sensor, or other sensor, or any of a variety of information that is obtained from a RF-RSSI information, a WLAN map, an RFID map, a vision map, and any other information,
   wherein the pre-stored first map includes coordinate information of a magnetic field map,
   wherein the magnetic field information at the coordinate information is saved as three-dimensional components.

16. The apparatus of claim 15, wherein the selecting unit is further configured to select the at least one search area from the plurality of candidate areas corresponding to the first location information based on the second location information and a statistical error of the second location information.

17. The apparatus of claim 15, wherein the search unit is further configured to search a pre-stored second map for a plurality of candidate areas corresponding to the second location information.

18. The apparatus of claim 17, wherein the selecting unit is further configured to select the at least one search area from the plurality of candidate areas corresponding to the first location information based on the plurality of candidate areas corresponding to the second location information.

19. The apparatus of claim 18, wherein the selecting unit comprises:
   a determiner configured to determine whether the plurality of candidate areas corresponding to the first location information overlap the plurality of candidate areas corresponding to the second location information; and
   a selector configured to select the at least one search area from the plurality of candidate areas corresponding to the first location information based on a result obtained by the determiner.

20. The apparatus of claim 19, wherein the selecting unit is further configured to select, as the at least one search area, an area of the plurality of candidate areas corresponding to the first location information that overlaps the plurality of candidate areas corresponding to the second location information.

21. The apparatus of claim 15, wherein the location of the user comprises an initial location of the user.

22. The apparatus of claim 15, wherein a range of each of the plurality of candidate areas corresponding to the first location information is pre-selected.

23. The apparatus of claim 15, wherein a range of each of the plurality of candidate areas corresponding to the first location information is pre-selected based on a statistical error of the first location information.

24. The apparatus of claim 15, wherein the search unit is further configured to search the pre-stored first map for the plurality of candidate areas corresponding to the first location information based on the first location information and a statistical error of the first location information.

25. The apparatus of claim 15, further comprising a storage unit configured to maintain information of a plurality of maps comprising the first map and information about a statistical error of each of the first location information and the second location information.

26. The apparatus of claim 15, wherein the first location information comprises horizontal location information measured by a magnetic field sensor and the second location information comprises vertical location information measured by the magnetic field sensor, or the first location information comprises the vertical location information and the second location information comprises the horizontal location information.

27. The apparatus of claim 15, wherein the first location information and the second location information indicate a same location.

28. A method of obtaining a location of a user of a portable terminal, the method performed by a processor comprising:
obtaining a search area containing the location of the user of a mobile device from a first map based on first location information of the user and second location information of the user using a magnetic field sensor; and
obtaining the location of the user within the search area using the search area;
wherein the search area is smaller than an entire area covered by the first map;
wherein the first location information includes one of a horizontal magnetic field component value, a vertical magnetic field component value, a direction of a magnetic field, and an angle between horizontality and verticality that are measured by a magnetic field sensor, and
wherein the second location information includes one of the horizontal magnetic field component value, the vertical magnetic field component value, the direction of the magnetic field, the angle between horizontality and verticality, and any other information that are measured by the magnetic field sensor except for the one included in the first location information, information that is measured by an acceleration sensor, an inertial sensor, a gyro sensor, a pressure sensor, an ultrasound sensor, or other sensor, or any of a variety of information that is obtained from a RF-RSSI information, a WLAN map, an RFID map, a vision map, and any other information, and
the first location information of the user and the second location information of the user are different types of location information,
wherein the first map includes coordinate information of a magnetic field map,
wherein the magnetic field information at the coordinate information is saved as three-dimensional components.

29. The method of claim 28, further comprising:
measuring a first physical quantity at the location of the user to obtain the first location information of the user; and
deriving the second location information of the user from the first location information of the user;
wherein the first map is created based on measurements made of the first physical quantity of a same type as the first physical quantity made at a plurality of different locations in the entire area covered by the first map.

30. The method of claim 28, further comprising:
measuring a first physical quantity at the location of the user to obtain the first location information of the user; and
measuring a second physical quantity at the location of the user to obtain the second location information of the user;
wherein the first map is created based on measurements of the first physical quantity made at a plurality of different locations in the entire area covered by the first map.

31. The method of claim 28, wherein the obtaining of the search area comprises:
searching the first map for a plurality of first candidate areas likely to contain the location of the user based on the first location information;
searching a second map for a plurality of second candidate areas likely to contain the location of the user based on the second location information, the second map covering a same area as the first map; and
selecting an area where plurality of first candidate areas overlaps the plurality of second candidate areas as the search area.

32. The method of claim 31, wherein the searching of the first map comprises limiting a range of each of the plurality of first candidate areas based on a statistical error of the first location information; and
the searching of the second map comprises limiting a range of each of the plurality of second candidate areas based on a statistical error of the second location information.

33. The method of claim 1, wherein the at least one search area comprises an intersection of areas of the first location information and the second location information.

* * * * *